(12) United States Patent
Kim (10) Patent No.: US 11,911,969 B2
(45) Date of Patent: Feb. 27, 2024

(54) 3D PRINTER WITH ADJUSTABLE LIGHT TRANSMISSION RATE AND CONTROL METHOD THEREOF

(71) Applicant: INDUSTRY-ACADEMIC COOPERATION FOUNDATION, DANKOOK UNIVERSITY, Yongin-si (KR)

(72) Inventor: Daekeun Kim, Seoul (KR)

(73) Assignee: INDUSTRY-ACADEMIC COOPERATION FOUNDATION, DANKOOK UNIVERSITY, Yongin-si (KR)

( * ) Notice: Subject to any disclaimer, the term of this patent is extended or adjusted under 35 U.S.C. 154(b) by 178 days.

(21) Appl. No.: 17/092,204

(22) Filed: Nov. 6, 2020

(65) Prior Publication Data
US 2022/0143921 A1    May 12, 2022

(51) Int. Cl.
| | |
|---|---|
| B29C 64/393 | (2017.01) |
| G02B 26/02 | (2006.01) |
| B29C 64/135 | (2017.01) |
| B33Y 50/02 | (2015.01) |
| B33Y 10/00 | (2015.01) |
| B33Y 30/00 | (2015.01) |
| B29C 64/268 | (2017.01) |

(52) U.S. Cl.
CPC .......... *B29C 64/393* (2017.08); *B29C 64/135* (2017.08); *B29C 64/268* (2017.08); *B33Y 10/00* (2014.12); *B33Y 30/00* (2014.12); *B33Y 50/02* (2014.12); *G02B 26/02* (2013.01)

(58) Field of Classification Search
None
See application file for complete search history.

(56) References Cited

U.S. PATENT DOCUMENTS

| | | | | |
|---|---|---|---|---|
| 2006/0227845 | A1* | 10/2006 | Degertekin | H04R 23/008 |
| | | | | 372/102 |
| 2014/0255666 | A1* | 9/2014 | Stucker | B29C 64/165 |
| | | | | 264/401 |
| 2017/0277024 | A1* | 9/2017 | Li | B29C 67/00 |

(Continued)

FOREIGN PATENT DOCUMENTS

KR    10-1798533 B1    11/2017

OTHER PUBLICATIONS

Polona, Light Transmission Rate, Aug. 1, 2018, Optics Trade Debates (Year: 2018).*

*Primary Examiner* — Seyed Masoud Malekzadeh
*Assistant Examiner* — Tiffany Yu Huang
(74) *Attorney, Agent, or Firm* — Revolution IP, PLLC (57) ABSTRACT

A 3D printer capable of adjusting a light transmission rate includes: a plate on which a forming material is disposed; a light source disposed above the plate and emitting light for curing the forming material; a course setting unit setting a processing course of the light emitted to the forming material; a beam shifting speed determination unit determining a beam shifting speed in each processing zone of the processing course set by the course setting unit; and a light transmission rate adjustment unit disposed between the forming material and the light source and adjusting a transmission rate of the light emitted to the forming material based on the beam shifting speed in each processing zone of the processing course.

8 Claims, 8 Drawing Sheets

(56) References Cited

U.S. PATENT DOCUMENTS

| | | | |
|---|---|---|---|
| 2020/0248017 A1* | 8/2020 | Hess | C09D 11/52 |
| 2020/0406358 A1* | 12/2020 | Nagahama | B22F 10/38 |
| 2021/0146617 A1* | 5/2021 | Dicken | B33Y 30/00 |
| 2021/0349224 A1* | 11/2021 | Svensson | B22F 10/28 |
| 2022/0048112 A1* | 2/2022 | Opschoor | B29C 64/295 |

* cited by examiner

3D PRINTER WITH ADJUSTABLE LIGHT TRANSMISSION RATE AND CONTROL METHOD THEREOF

FIELD

The present invention relates to a three-dimensional (3D) printer capable of adjusting a light transmission rate and a control method thereof, and more particularly, to a 3D printer capable of adjusting a light transmission rate, which can provide a uniform degree of curing in each processing zone of a forming material through adjustment of a light transmission rate on the forming material based on a beam shifting speed in each zone of the forming material upon processing the forming material through irradiation with light, and a control method thereof.

BACKGROUND

A 3D printer refers to an apparatus capable of forming a target three-dimensional shape through a printing technique.

The 3D printer can manufacture a three-dimensional prototype based on 3D modeling data created through computer-aided design (CAD) or computer-aided manufacturing (CAM). Such a 3D printer is applied to various fields including industries, daily life, medicine, and the like.

Fundamentally, a general 3D printer is configured to form a 3D object by stacking thin two-dimensional (2D) layers.

3D printers capable of manufacturing such a 3D product are generally classified into a stereolithography apparatus (SLA) type in which a photocurable resin is irradiated with laser beams, a selective laser sintering (SLS) type in which powder is irradiated with laser beams, a fused deposition modeling (FDM) type in which plastic filaments are fused and ejected through a nozzle, and a digital light processing (DLP) type in which a reservoir storing a photocurable resin is irradiated with light.

Thereamong, in a technique of curing a material through irradiation with laser beams, since resolution is changed depending upon the diameter of laser beams, the resolution of a final product is adjusted by decreasing the diameter of the laser beams.

In addition, the material may be cured by shifting the laser beams along a processing course having various patterns including a raster pattern, a spiral pattern, a Lissajous pattern, and the like.

Here, upon shifting the laser beams, the shifting speed in each zone of the processing course may be changed. For example, in the processing course of the raster pattern, the shifting speed is faster in a curved zone than in a linear zone, thereby causing difference in laser irradiation time between the zones.

As described above, as the laser irradiation time is different between the processing zones of the material, there is a problem with uneven curing over the processing zones.

RELATED LITERATURE

Patent Document (Patent Document 0001) Korean Patent Registration No. 10-1798533 (Title of the Invention: Modeling apparatus and method by 3D printer, Issue date: Nov. 10, 2017)

SUMMARY

Embodiments of the present invention have been conceived to solve such a problem in the related art and it is an aspect of the present invention to provide a 3D printer capable of adjusting a light transmission rate, which can provide a uniform degree of curing in each zone of a forming material through adjustment of a light transmission rate on the forming material based on a beam shifting speed in each zone of the forming material upon processing the forming material through irradiation with light, and a control method thereof.

In accordance with one aspect of the present invention, there is provided a 3D printer capable of adjusting a light transmission rate including: a plate on which a forming material is disposed; a light source disposed above the plate and emitting light for curing the forming material; a course setting unit setting a processing course of the light emitted to the forming material; a beam shifting speed determination unit determining a beam shifting speed in each processing zone of the processing course set by the course setting unit; and a light transmission rate adjustment unit disposed between the forming material and the light source and adjusting a transmission rate of the light emitted to the forming material based on the beam shifting speed in each processing zone of the processing course.

When the beam shifting speed determination unit determines that the beam shifting speed is faster in a second processing zone than in a first processing zone, the light transmission rate adjustment unit may adjust the transmission rate of the light such that a transmission rate of light emitted to the second processing zone is lower than a transmission rate of light emitted to the first processing zone.

The light transmission rate adjustment unit may be formed in a pattern of the processing course set by the course setting unit.

The light transmission rate adjustment unit may include a DLP mirror and may adjust the light transmission rate through on/off operation of each of micromirrors in a DLP mirror.

The light transmission rate adjustment unit may include a translucent plate and may adjust the light transmission rate depending upon transparency of the translucent plate.

In accordance with another aspect of the present invention, there is provided a control method of a 3D printer capable of adjusting a light transmission rate, including the steps of: setting a processing course of light emitted to a forming material to cure the forming material; determining a beam shifting speed in each of processing zones of the processing course set in the step of setting a processing course; adjusting, by a light transmission rate adjustment unit, a transmission rate of the light emitted to the forming material based on the beam shifting speed in each of the processing zones of the processing course; and irradiating the forming material with light at the transmission rate of the light in each of the processing zones to cure the forming material while shifting light beams along the processing course.

Upon determining in the step of determining a beam shifting speed that the beam shifting speed is faster in a second processing zone than in a first processing zone, the transmission rate of the light may be adjusted in the step of adjusting a transmission rate of the light such that a transmission rate of light emitted to the second processing zone is lower than a transmission rate of light emitted to the first processing zone.

In the step of adjusting a transmission rate of the light, the light transmission rate adjustment unit may be formed in a pattern of the processing course set by the course setting unit.

The 3D printer capable of adjusting a light transmission rate and the control method thereof according to the present invention provide the following advantageous effects.

Firstly, it is possible to secure a uniform degree of curing in each zone of a forming material through adjustment of a light transmission rate on the forming material based on a beam shifting speed in each zone of the forming material upon processing the forming material through irradiation with light.

Secondly, the light transmission rate adjustment unit is disposed between the light source and the forming material to adjust the transmission rate of light emitted to the forming material based on the beam shifting speed in each zone of a processing course, thereby enabling more convenient manufacture of a 3D product through omission of a control algorithm for adjustment of the light transmission rate.

DETAILED DESCRIPTION

Hereinafter, embodiments of the present invention will be described with reference to the accompanying drawings. It should be understood that the present invention may be embodied in different ways and is not limited to the following embodiments. In the drawings, portions irrelevant to the description will be omitted for clarity and like components will be denoted by like reference numerals throughout the specification.

Referring to FIG. 1 to FIG. 9, a 3D printer capable of adjusting a light transmission rate according to the present invention will now be described.

Figure 1:
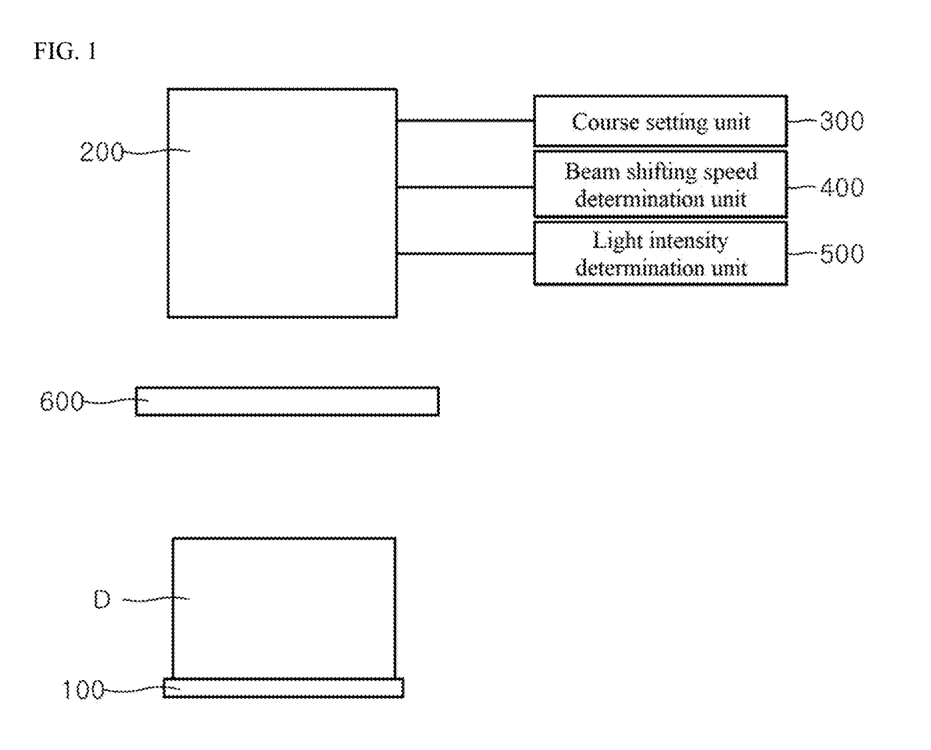
FIG. 1 is a schematic diagram of a 3D printer capable of adjusting a light transmission rate according to the present invention.

FIG. 1 is a schematic diagram of a 3D printer capable of adjusting a light transmission rate according to the present invention. Referring to FIG. 1, the 3D printer according to the present invention includes a plate 100, a light source 200, a course setting unit 300, a beam shifting speed determination unit 400, a light intensity determination unit 500, and a light transmission rate adjustment unit 600.

The plate 100 is disposed above a forming material D that is a curing target.

The light source 200 is disposed above the plate 100 and emits light for curing the forming material D.

The course setting unit 300 sets a processing course of light emitted to the forming material D. The processing course may have various patterns including a raster pattern, a spiral pattern, a Lissajous pattern, and the like.

The beam shifting speed determination unit 400 calculates a beam shifting speed in each processing zone of the processing course set by the course setting unit 300.

Figure 2:
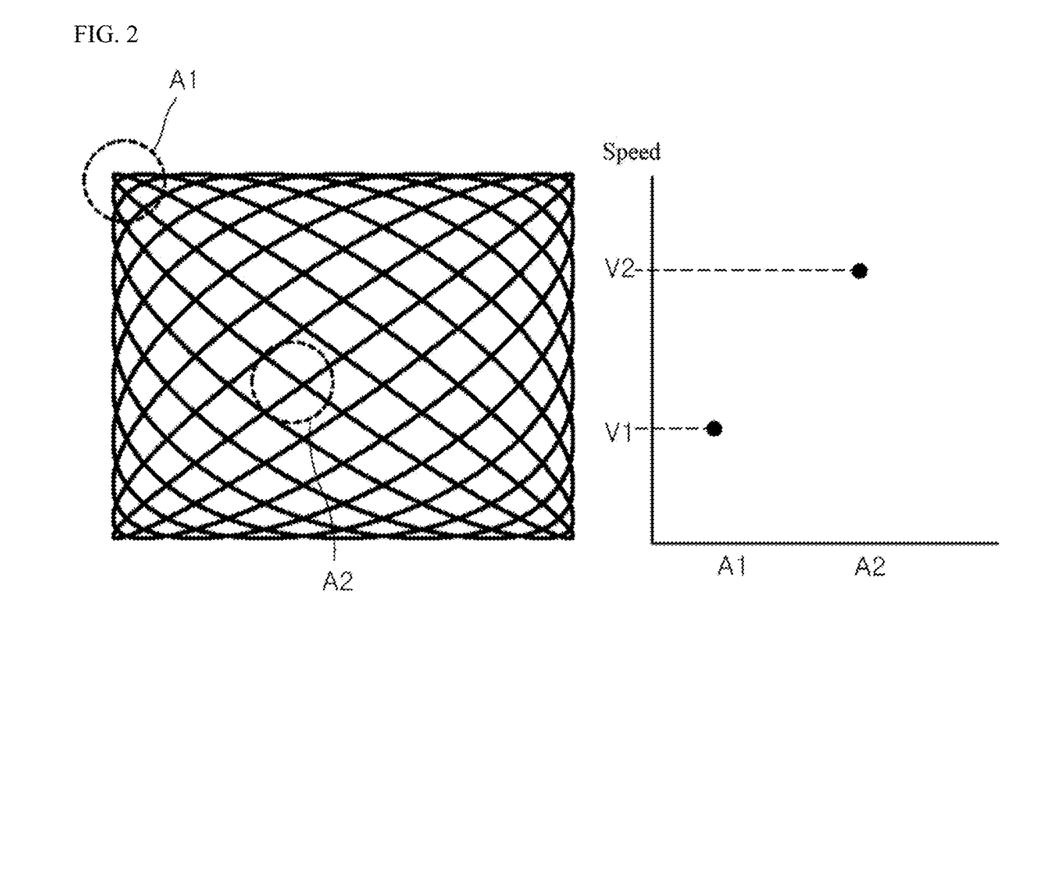
FIG. 2 is a view of an example of a beam shifting speed in each processing zone determined by a beam shifting speed determination unit in the 3D printer according to the present invention.

FIG. 2 is a view of an example of a beam shifting speed in each processing zone determined by the beam shifting speed determination unit 400 in the 3D printer according to the present invention. Referring to FIG. 2, when the processing course of the light set by the course setting unit 300 is a Lissajous pattern, a beam shifting speed V1 in a first processing zone A1 having a high degree of curvature in the processing course is slower than a beam shifting speed V2 in a second processing zone A2 having a low degree of curvature in the processing course.

Since the first processing zone A1 is a region in which beam shifting is sometimes performed in a rotating manner, beam shifting is performed at a slower speed in the first processing zone A1 than in the second processing zone A2 having a low degree of curvature.

The light intensity determination unit 500 determines the accumulated intensity of light emitted to the forming material D in each processing zone of the processing course.

Figure 3:
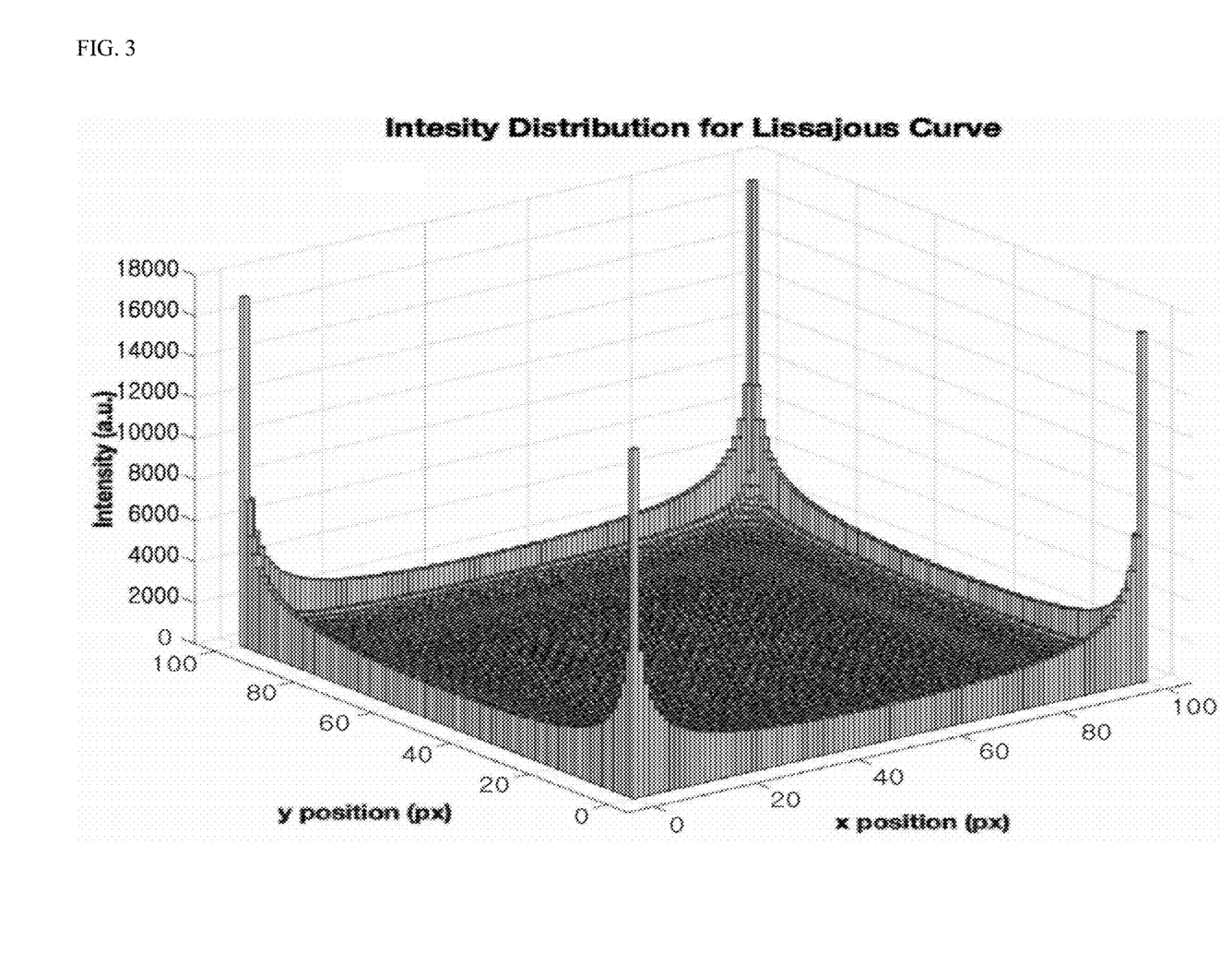
FIG. 3 is a graph depicting an analysis result of a light transmission rate in processing zones of a Lissajous curve in the 3D printer according to the present invention.

FIG. 3 is a graph depicting an analysis result of a light transmission rate in processing zones of a Lissajous curve in the 3D printer according to the present invention, in which the accumulated intensity of light emitted to the forming material D in each processing zone of the processing course is determined based on the beam shifting speed in each processing zone of the processing course determined by the beam shifting speed determination unit 400.

FIG. 3 shows that the accumulated intensity of light in the first processing zone A1 having a high degree of curvature in the processing course is greater than the accumulated intensity of light in the second processing zone A2 having a low degree of curvature in the processing course.

The light transmission rate adjustment unit 600 is disposed between the forming material D and the light source 200 and adjusts the transmission rate of light emitted to the forming material D based on the beam shifting speed and the accumulated intensity of the light in each processing zone of the processing course.

Specifically, the light transmission rate adjustment unit 600 may be formed in a pattern of the processing course set by the course setting unit 300 and may be realized in various embodiments.

Figure 4:
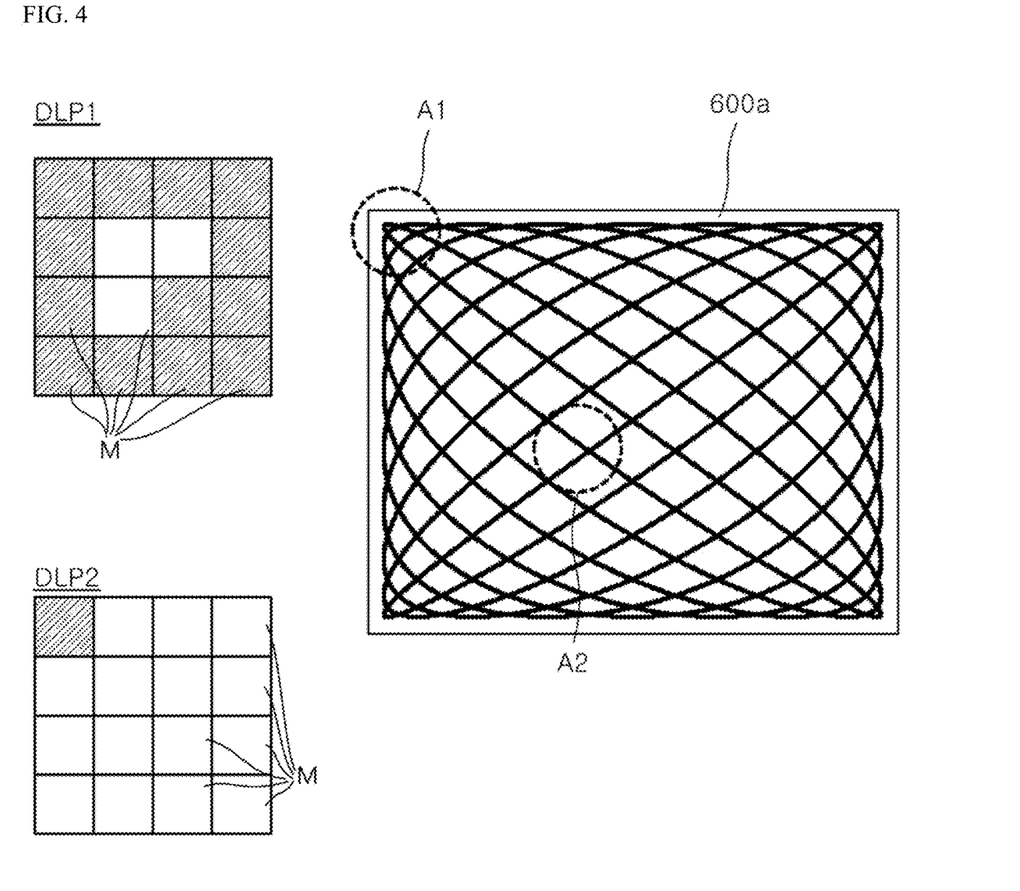
FIG. 4 is a view of a first embodiment of a light transmission rate adjustment unit of the 3D printer according to the present invention.

FIG. 4 is a view of a first embodiment of the light transmission rate adjustment unit 600 of the 3D printer according to the present invention. Referring to FIG. 4, the light transmission rate adjustment unit 600 according to this embodiment is constituted by the DLP mirror 600a.

The DLP mirrors 600a are disposed corresponding to the pattern of the processing course and adjustment of the light transmission rate by the light transmission rate adjustment unit 600 may be performed by on/off operation of each of micromirrors M included in the DLP mirror 600a.

That is, as shown in FIG. 4, among 16 micromirrors M included in the DLP mirror (DLP1) 600a in the first processing zone A1, only 3 micromirrors M are driven in an ON state and 13 micromirrors M are driven in an OFF state, and, among 16 micromirrors M included in the DLP mirror (DLP2) 600a in the second processing zone A2, only 15 micromirrors M are driven in an ON state and the remaining one micromirror M is driven in an OFF state. The transmission rate of light emitted to the forming material D may be adjusted by adjusting the number of micromirrors M included in the DLP mirror 600a and driven in an ON state.

In addition, the micromirrors M may be operated in an ON/OFF state according to an operation time ratio. That is, a gray scale is determined depending upon the ratio of ON-state time to OFF state time and the light transmission rate is adjusted depending on the gray scale.

Obviously, the number of micromirrors M included in the DLP mirrors 600a and a standard for ON/OFF operation are not limited to the above example and may be changed depending upon the kind of pattern, the size of an object to be processed, and the like.

Figure 5:
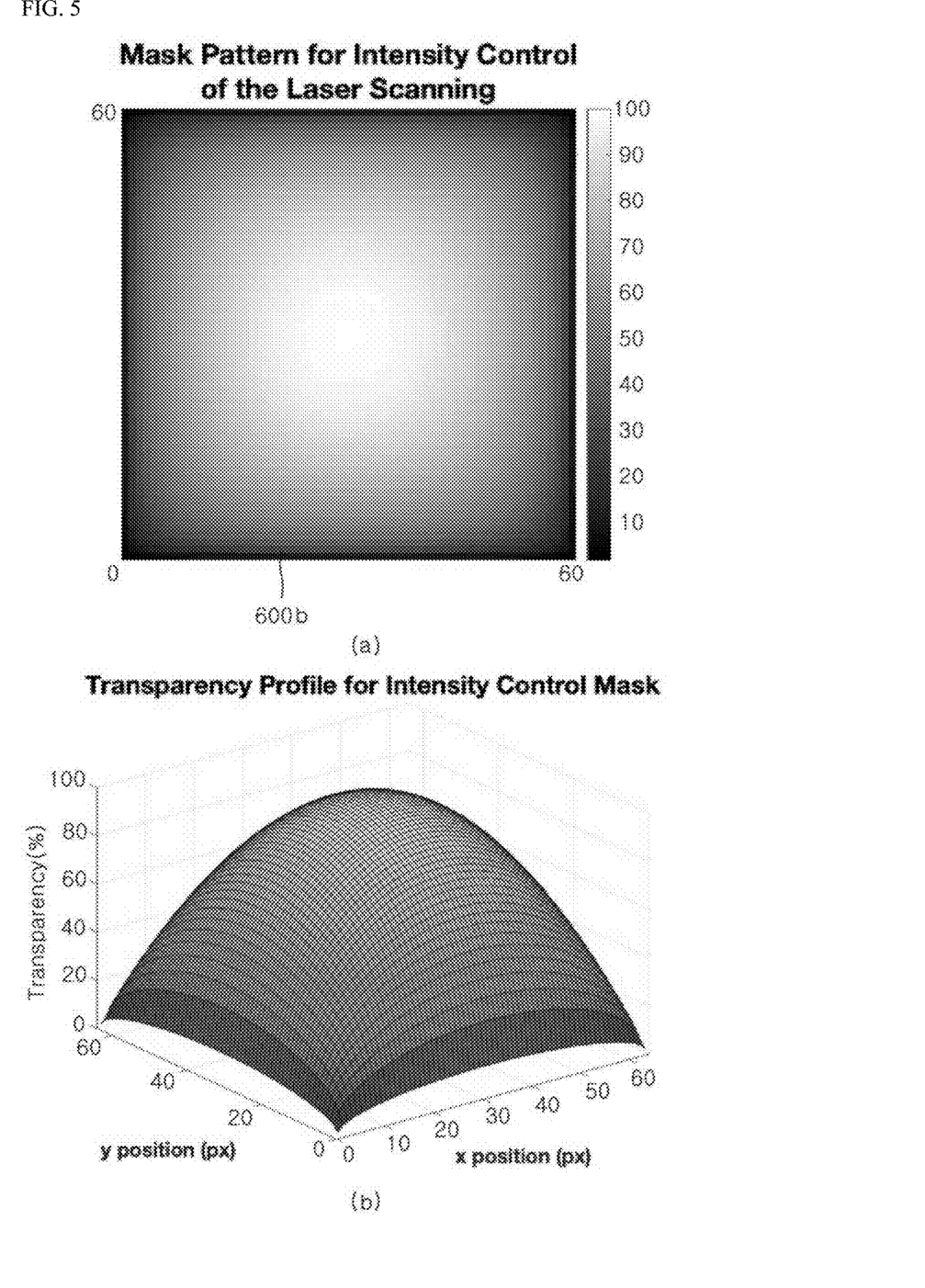
FIG. 5 is a view of a second embodiment of the light transmission rate adjustment unit of the 3D printer according to the present invention.

FIG. 5 is a view of a second embodiment of the light transmission rate adjustment unit 600 of the 3D printer according to the present invention. Referring to FIG. 5, the light transmission rate adjustment unit 600 according to this embodiment may be constituted by a translucent plate 600b having a shape corresponding to the pattern of the processing course.

As shown in FIG. 5(a), the light transmission rate by the light transmission rate adjustment unit 600 may be adjusted corresponding to transparency of the translucent plate 600b and FIG. 5(b) shows transparency of the translucent plate 600b.

That is, transparency in each processing zone of the translucent plate 600b is inversely proportional to the accumulated intensity of light, thereby enabling adjustment of the transmission rate of light emitted to the forming material D.

FIG. 6 to FIG. 9 are views of 3D printers capable of adjusting a light transmission rate according to first to fourth embodiments of the present invention. The 3D printers according to the first to fourth embodiments of the present invention will be described with reference to FIG. 6 to FIG. 9.

Figure 6:
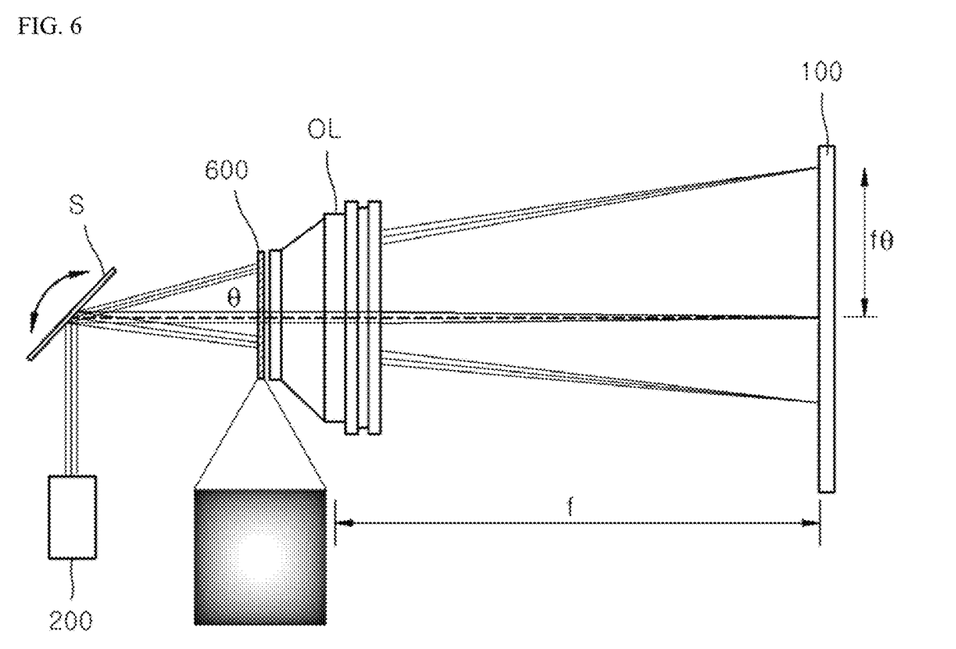
FIG. 6 to FIG. 9 are views of 3D printers capable of adjusting a light transmission rate according to first to fourth embodiments of the present invention.

First, referring to FIG. 6, the 3D printer according to the first embodiment includes the plate 100, a light source 200, a course setting unit 300, a beam shifting speed determination unit 400, a light intensity determination unit 500, a light transmission rate adjustment unit 600, a scanner S, and an objective lens OL.

Referring to FIG. 6, the light transmission rate adjustment unit 600 is disposed above the plate 100. In this embodiment, preferably, the light transmission rate adjustment unit 600 is a translucent plate.

The objective lens OL is disposed between the light transmission rate adjustment unit 600 and the plate 100; the scanner S is disposed above the light transmission rate adjustment unit 600; and the light source 200 is disposed at a side of the scanner S.

That is, a region of the plate 100 irradiated with light emitted from the light source 200 is changed corresponding to an angle of the scanner S, and, since the light reaches the plate 100 after passing through the light transmission rate adjustment unit 600, the transmission rate of the light having reached the plate 100 is changed depending upon the region of the plate 100.

Figure 7:
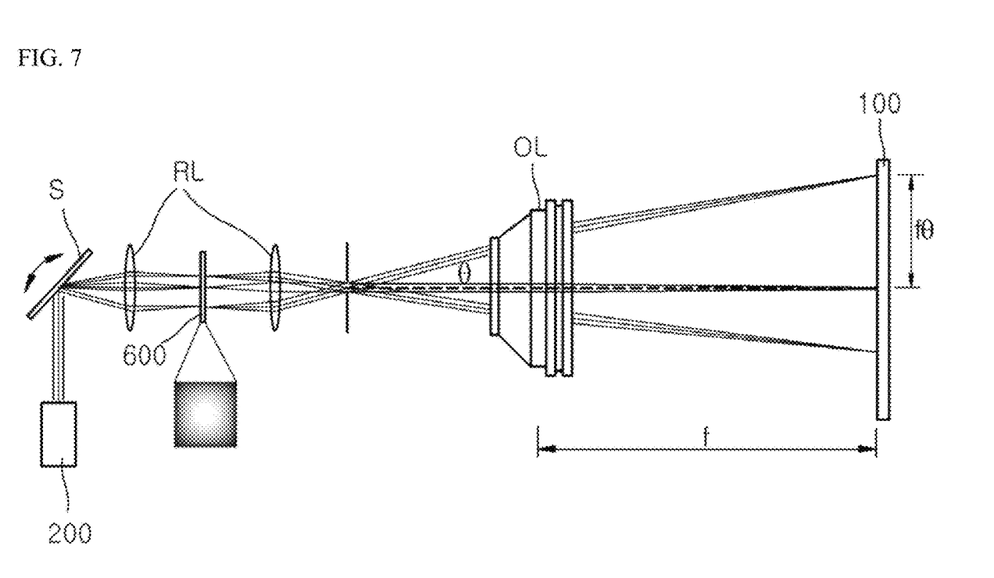

Referring to FIG. 7, the 3D printer according to the second embodiment includes the plate 100, a light source 200, a course setting unit 300, a beam shifting speed determination unit 400, a light intensity determination unit 500, a light transmission rate adjustment unit 600, a scanner S, an objective lens OL, and a relay lens RL.

Arrangement of the components of the 3D printer according to the second embodiment is generally the same as that of the 3D printer according to the first embodiment.

In the 3D printer according to the second embodiment, the relay lens RL includes multiple relay lenses RL, which are disposed above and below the light transmission rate adjustment unit 600 such that the light transmission rate adjustment unit 600 is disposed at a focal point formed between the multiple relay lenses RL, thereby enabling accurate control of light output.

Figure 8:
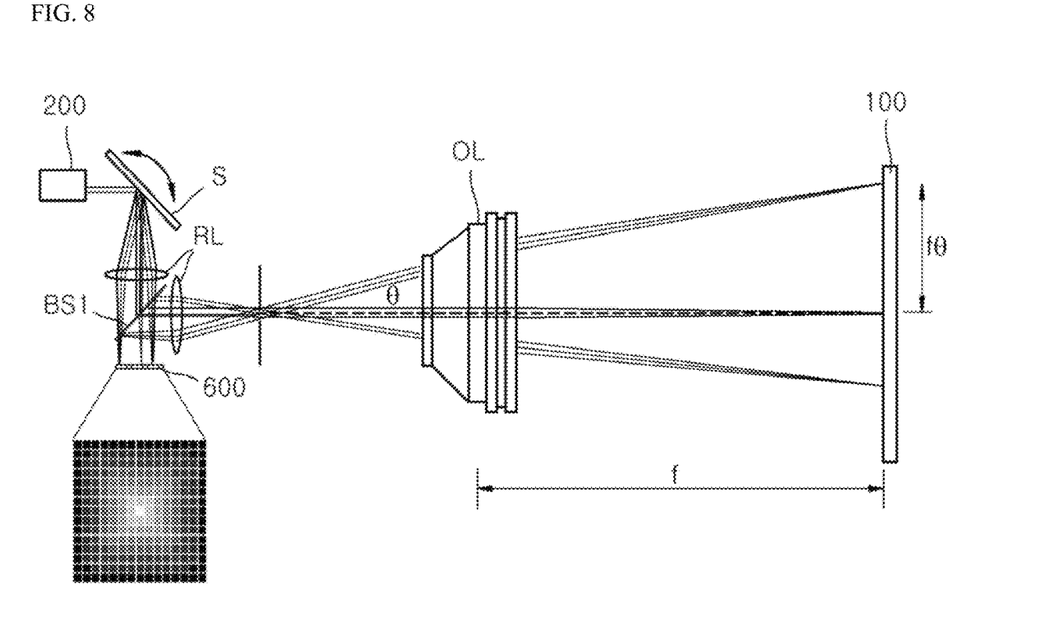

Referring to FIG. 8, the 3D printer according to the third embodiment includes the plate 100, a light source 200, a course setting unit 300, a beam shifting speed determination unit 400, a light intensity determination unit 500, a light transmission rate adjustment unit 600, a scanner S, an objective lens OL, a relay lens RL, and a 50:50 beam splitter BS1.

Referring to FIG. 8, the objective lens OL and the light transmission rate adjustment unit 600 are sequentially disposed above the plate 100. According to this embodiment, preferably, the light transmission rate adjustment unit 600 is a DLP mirror.

The scanner S is disposed at one side of the light transmission rate adjustment unit 600 and transmits light towards the light transmission rate adjustment unit 600 upon receiving the light.

That is, a region of the plate 100 irradiated with light emitted from the light source 200 is changed corresponding to an angle of the scanner S, and, since the light reaches the plate 100 after passing through the light transmission rate adjustment unit 600, the transmission rate of the light having reached the plate 100 is changed depending upon the region of the plate 100.

Here, the relay lenses RL and the 50:50 beam splitter BS1 are disposed between the scanner S and the light transmission rate adjustment unit 600.

The relay lens RL includes multiple relay lenses, one of which is disposed between the 50:50 beam splitter BS1 and the scanner S and the other of which is disposed between the 50:50 beam splitter BS1 and the objective lens OL.

That is, light having passed through the scanner S passes through the 50:50 beam splitter BS1 and is reflected by the light transmission rate adjustment unit 600. Then, the light reflected by the light transmission rate adjustment unit 600 is reflected by the 50:50 beam splitter BS1 and is transmitted to the objective lens OL, whereby the light emitted from the light source 200 can reach the plate 100 via the light transmission rate adjustment unit 600.

Figure 9:
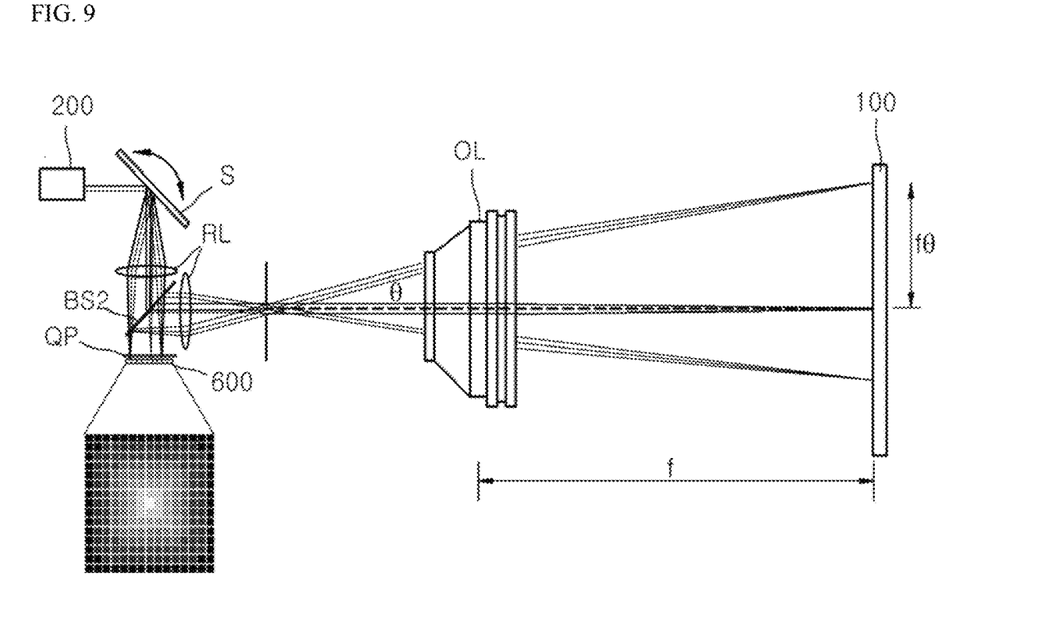

Referring to FIG. 9, the 3D printer according to the fourth embodiment includes the plate 100, a light source 200, a course setting unit 300, a beam shifting speed determination unit 400, a light intensity determination unit 500, a light transmission rate adjustment unit 600, a scanner S, an objective lens OL, a relay lens RL, a polarizing beam splitter BS2, and a quarter wave plate QP.

Arrangement of the components of the 3D printer according to the fourth embodiment is generally the same as that of the 3D printer according to the third embodiment.

In this embodiment, the polarizing beam splitter BS2 is disposed instead of the 50:50 beam splitter BS1 and the quarter wave plate QP is disposed between the light transmission rate adjustment unit 600 and the polarized beam splitter BS2.

That is, light having passed through the scanner S passes through the polarizing beam splitter BS2 and is reflected by the light transmission rate adjustment unit 600. Then, the light reflected by the light transmission rate adjustment unit 600 is reflected by the polarizing beam splitter BS2 and is transmitted to the objective lens OL, whereby the light emitted from the light source 200 can reach the plate 100 via the light transmission rate adjustment unit 600.

Since a polarization direction of the light must be changed when the light passes through the polarizing beam splitter BS2 or is reflected thereby, the quarter wave plate QP is disposed between the polarizing beam splitter BS2 and the light transmission rate adjustment unit 600, thereby preventing power loss of light that occurs in use of the 50:50 beam splitter BS1.

Referring to FIG. 1 to FIG. 10, a control method of the 3D printer capable of adjusting a light transmission rate according to the present invention will be described.

Figure 10:
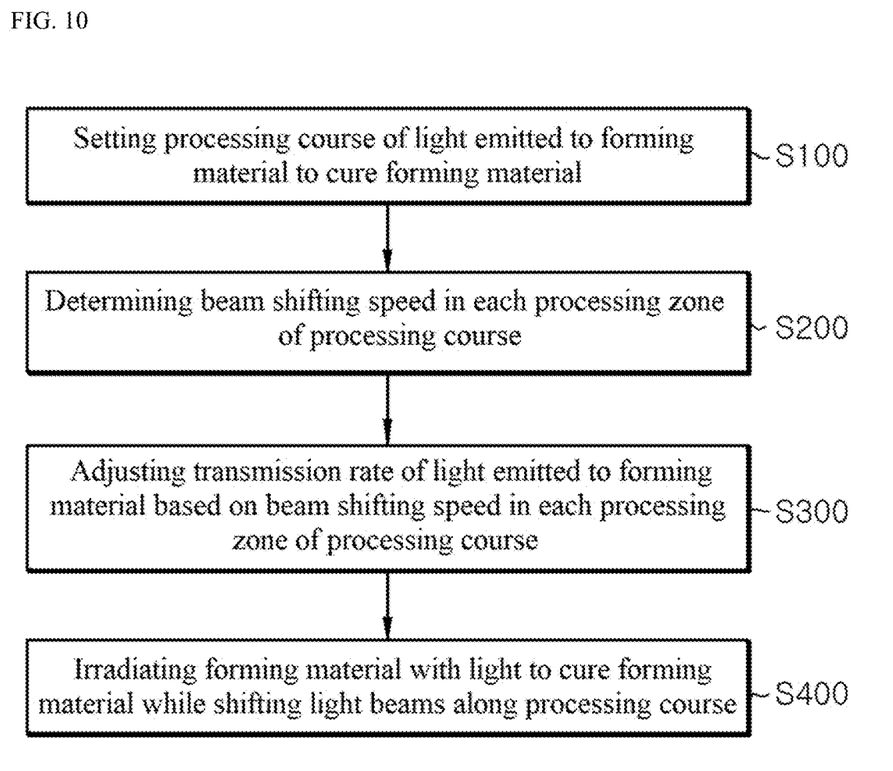
FIG. 10 is a view illustrating a control method of the 3D printer capable of adjusting a light transmission rate according to the present invention.

FIG. 10 is a view illustrating a control method of the 3D printer capable of adjusting a light transmission rate according to the present invention. As shown in FIG. 10, the control method of the 3D printer according to the present invention includes a course setting step S100, a beam shifting speed determination step S200, an accumulated light intensity determination step S300, a transmission rate adjustment step S400, and a light irradiation step S500.

In the course setting step S100, a processing course of light emitted to a forming material D is set by the course setting unit 300 to cure the forming material D.

In the beam shifting speed determination step S200, the beam shifting speed determination unit 400 determines a beam shifting speed in each processing zone of the processing course set in the course setting step S100.

In the accumulated light intensity determination step S300, the light intensity determination unit 500 determines the accumulated intensity of the light emitted to the forming material D in each processing zone of the processing course.

In the transmission rate adjustment step S400, the light transmission rate adjustment unit 600 adjusts the transmission rate of the light emitted to the forming material D based on the beam shifting speed in each processing zone of the processing course.

In the transmission rate adjustment step S400, the light transmission rate adjustment unit 600 may be formed in a pattern of the processing course set by the course setting unit 300.

Detailed description of the control method of the 3D printer according to the present invention corresponds to the above description of the 3D printer capable of adjusting a light transmission rate according to the present invention and thus is omitted.

It should be understood that the scope of the present invention is defined by the following claims and all changes or modifications derived from the meaning and scope of the claims and equivalents thereto should be construed as being within the scope of the present invention.

REFERENCE NUMERALS

100: Plate
200: Light source
300: Course setting unit
400: Beam shifting speed determination unit
500: Light intensity determination unit
600, 600a, 600b: Light transmission rate adjustment unit
S: Scanner
OL: Objective lens
RL: Relay lens
BS1: 50:50 beam splitter
BS2: Polarizing beam splitter
QP: Quarter wave plate

What is claimed is:

1. A 3D printer capable of adjusting a light transmission rate, comprising:
   a plate on which a forming material is disposed;
   a light source disposed above the plate and emitting light for curing the forming material;
   a course setting unit setting a processing course of the light emitted to the forming material;
   a beam shifting speed determination unit determining a beam shifting speed in each processing zone of the processing course set by the course setting unit; and
   a light intensity determination unit determining an accumulated intensity of light emitted to the forming material in each processing zone of the processing course, wherein the accumulated intensity of light is determined based on the beam shifting speed in each processing zone of the processing course determined by the beam shifting speed determination unit;
   a translucent plate disposed between the forming material and the light source and adjusting a transmission rate of the light emitted to the forming material based on the beam shifting speed in each processing zone of the processing course and the accumulated intensity of light;
   wherein a transparency in each processing zone of the translucent plate is inversely proportional to the accumulated intensity of light, and the transmission rate of light is adjusted corresponding to the transparency of the translucent plate.

2. The 3D printer according to claim 1, wherein, when the beam shifting speed determination unit determines that the beam shifting speed is faster in a second processing zone than in a first processing zone, a transmission rate of light emitted to the second processing zone is lower than a transmission rate of light emitted to the first processing zone at the translucent plate.

3. The 3D printer according to claim 2, wherein the translucent plate is formed in a pattern of the processing course set by the course setting unit.

4. The 3D printer according to claim 1, wherein the processing course is selected from the group consisting of a Lissajous pattern, a spiral pattern and a raster pattern,
   wherein the translucency of the translucent plate is formed in inverse proportion to the cumulative light intensity based on the group consisting of a Lissajous pattern, a spiral pattern and a raster pattern.

5. A control method of a 3D printer capable of adjusting a light transmission rate, comprising the steps of:
   setting a processing course of light emitted to a forming material to cure the forming material;
   determining a beam shifting speed in each of processing zones of the processing course set in the step of setting a processing course;
   determining an accumulated intensity of light emitted to the forming material in each processing zone of the processing course, wherein the accumulated intensity of light is determined based on the beam shifting speed in each processing zone of the processing course;
   adjusting, by forming a translucent plate, a transmission rate of the light emitted to the forming material based on the beam shifting speed in each of the processing zones of the processing course and the accumulated intensity of light, wherein the transmission rate of the light is adjusted corresponding to a transparency of the translucent plate; and
   irradiating, by a light source, the forming material with light at the transmission rate of the light in each of the processing zones to cure the forming material while shifting light beams along the processing course, wherein, in the step of adjusting the transmission rate of the light, the translucent plate is disposed between the forming material and the light source, wherein the translucent plate is formed with an area covering an entire area of the forming material irradiated with light from the light source, wherein a translucency in each processing zone of the translucent plate is inversely proportional to the accumulated intensity of the light irradiated to the forming material corresponding to the area of the translucent plate.

6. The control method according to claim 5, wherein, upon determining in the step of determining a beam shifting speed that the beam shifting speed is faster in a second processing zone than in a first processing zone, the transmission rate of the light is adjusted in the step of adjusting a transmission rate of the light such that a transmission rate of light emitted to the second processing zone is lower than a transmission rate of light emitted to the first processing zone.

7. The control method according to claim 6, wherein, in the step of adjusting a transmission rate of the light, the translucent plate is formed in a pattern of the processing course set by the course setting unit.

8. The control method according to claim 5, wherein the processing course is selected from the group consisting of a Lissajous pattern, a spiral pattern and a raster pattern, wherein the translucency of the translucent plate is formed in inverse proportion to the cumulative light intensity based on the group consisting of a Lissajous pattern, a spiral pattern and a raster pattern.

* * * * *